United States Patent
Hyodo et al.

(10) Patent No.: US 11,286,646 B2
(45) Date of Patent: Mar. 29, 2022

(54) LOADING VEHICLE

(71) Applicant: HITACHI CONSTRUCTION MACHINERY CO., LTD., Tokyo (JP)

(72) Inventors: Koji Hyodo, Kasumigaura (JP); Fumihiro Nakao, Abiko (JP); Yasunori Miyamoto, Ushiku (JP); Masaki Nukii, Ushiku (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 0 days.

(21) Appl. No.: 16/973,794

(22) PCT Filed: Mar. 13, 2019

(86) PCT No.: PCT/JP2019/010342
§ 371 (c)(1),
(2) Date: Dec. 10, 2020

(87) PCT Pub. No.: WO2020/183666
PCT Pub. Date: Sep. 17, 2020

(65) Prior Publication Data
US 2021/0262202 A1  Aug. 26, 2021

(51) Int. Cl.
*E02F 9/22* (2006.01)
*E02F 3/28* (2006.01)
(Continued)

(52) U.S. Cl.
CPC ............ *E02F 9/2253* (2013.01); *E02F 3/283* (2013.01); *E02F 3/422* (2013.01); *E02F 9/2292* (2013.01);
(Continued)

(58) Field of Classification Search
None
See application file for complete search history.

(56) References Cited

U.S. PATENT DOCUMENTS 5,784,883 A * 7/1998 Ohkura ............... F16H 61/4017
60/327
8,327,638 B2 * 12/2012 Ohtsukasa ............ F16H 61/431
60/445
(Continued)

FOREIGN PATENT DOCUMENTS

JP  2013-053699 A  3/2013
JP  2013-124735 A  6/2013
JP  2018-115769 A  7/2018

OTHER PUBLICATIONS

International Search Report of PCT/JP2019/010342 dated May 14, 2019.

*Primary Examiner* — Michael Leslie
(74) *Attorney, Agent, or Firm* — Mattingly & Malur, PC (57) ABSTRACT

Provided is a loading vehicle in which a control characteristic of traction force can be easily and finely set and changed while a configuration of a hydraulic circuit is simple. An HST traveling driven wheel loader includes an electronically controlled HST pump and HST motor, including a solenoid proportional pressure reducing valve to control displacement volume of the HST pump based on a control signal output from a controller. The controller stores characteristic tables indicating a correlation between discharge pressure of a loading hydraulic pump or an operation state of an engine and a maximum discharge pressure of the HST pump, and when the vehicle speed corresponds to work requiring traction force, outputs a control signal to the solenoid proportional pressure reducing valve so as to obtain the maximum discharge pressure Pm of the HST pump that corresponds to one of the characteristic tables.

5 Claims, 7 Drawing Sheets

(51) Int. Cl.
   *E02F 3/42* (2006.01)
   *F15B 15/20* (2006.01)

(52) U.S. Cl.
   CPC ............ *E02F 9/2296* (2013.01); *F15B 15/20* (2013.01); *E02F 9/2285* (2013.01); *F15B 2215/30* (2013.01)

(56) References Cited

U.S. PATENT DOCUMENTS

| | | | |
|---|---|---|---|
| 9,057,437 B2* | 6/2015 | Kaneko | B66F 9/22 |
| 9,631,345 B2* | 4/2017 | Tanaka | F16H 61/431 |
| 10,280,949 B2* | 5/2019 | Kondo | E02F 9/2225 |
| 10,947,701 B2* | 3/2021 | Hyodo | E02F 9/2235 |
| 2021/0189690 A1* | 6/2021 | Hyodo | F16H 61/421 |

* cited by examiner

ENGINE ROTATIONAL SPEED N[rpm]

FIG. 7B

ACCELERATOR PEDAL STEP-ON AMOUNT ST[%]

FIG. 8

LOADING VEHICLE

TECHNICAL FIELD

The present invention relates to a loading vehicle on which an HST traveling drive system is mounted.

BACKGROUND ART

As represented by a wheel loader, in a loading vehicle having a hydraulic circuit for traveling and a hydraulic circuit for a working device which performs loading work, since a traveling hydraulic pump and a loading hydraulic pump are driven by the same engine, balance between traction force (traveling drive force) and digging force of a working device is important. For example, in a case where the traction force is too large with respect to the digging force of the working device, wheels slip when the lift arm is operated to lift a bucket upward after the bucket is made to thrust into an object to be excavated. As a result, the traction force is rather reduced, which makes it difficult to put loads such as earth and sand into the bucket. In addition, since reaction force acting on the lift arm becomes large when making the bucket thrust into the object to be excavated, there is a case where the reaction force becomes resistance and the bucket or the lift arm may not be lifted upward.

For example, Patent Literature 1 discloses a hydraulic drive device of a wheel-type work vehicle comprising a cut-off valve which is a hydraulic pilot type two-position valve and is operated when the sum of discharge pressure of the traveling hydraulic pump and discharge pressure of the loading hydraulic pump (hydraulic pump for a working device) is equal to or greater than a reference value. The cut-off valve controls displacement volume of the traveling hydraulic pump so that the higher the discharge pressure of the loading hydraulic pump is, the lower the discharge pressure of the traveling hydraulic pump is made to be. With this configuration, the displacement volume of the traveling hydraulic pump is limited in accordance with the discharge pressure of the loading hydraulic pump to prevent the traction force from becoming too large when operating the working device, thereby improving balance between the traction force and the drive force (digging force) of the working device.

Furthermore, the reference value of the sum of the discharge pressure of the traveling hydraulic pump and the discharge pressure of the loading hydraulic pump can be set from among three types of reference values by switching a dial, thereby allowing a characteristic of an upper limit of the traction force with respect to the discharge pressure of the loading hydraulic pump to be changed based on intention of an operator.

CITATION LIST

Patent Literature

[Patent Literature 1] JP 2013-53699 A

SUMMARY OF INVENTION

Technical Problem

The hydraulic drive device of the wheel-type work vehicle disclosed in Patent Literature 1 is configured to limit the traction force by limiting the discharge pressure of the traveling hydraulic pump, and accordingly, as compared with a case in which a tilting amount of the traveling hydraulic motor is limited, response of large/small changes in the traction force is fast. However, since the discharge pressure of the traveling hydraulic pump is limited by using a hydraulic pilot type cut-off valve, for example, the number of components in the hydraulic circuit is increased and routing of hydraulic piping becomes complicated, which have led to increase in a space and cost required to configure the hydraulic circuit.

Furthermore, although the upper limit of the traction force can be selected by switching positions of the dial, a control characteristic of the traction force itself comprises only a characteristic in which the higher the discharge pressure of the loading hydraulic pump is, the lower the discharge pressure of the traveling hydraulic pump is made to be. As a result, it is difficult to finely set and change the control characteristic of the traction force in accordance with contents of work, an environment of a work site, preference of the operator, etc.

An object of the present invention is to provide a loading vehicle in which a control characteristic of traction force can be easily and finely set and changed while a configuration of a hydraulic circuit is simple.

Solution to Problem

In order to achieve the object above, the present invention provides a loading vehicle comprising: a vehicle body including a plurality of wheels; an engine mounted on the vehicle body; a variable displacement traveling hydraulic pump that is driven by the engine; a traveling hydraulic motor that is connected to the traveling hydraulic pump through a closed circuit and transmits drive force of the engine to the plurality of wheels; a working device that is mounted rotatably in a vertical direction with respect to the vehicle body; a loading hydraulic pump that is driven by the engine and supplies hydraulic oil to the working device; a discharge pressure sensor that detects discharge pressure of the loading hydraulic pump; an operation state sensor that detects an operation state of the engine; and a vehicle speed sensor configured to detect vehicle speed, wherein both the traveling hydraulic pump and the traveling hydraulic motor are electronically controlled, the loading vehicle further comprises: a controller configured to control the traveling hydraulic pump and the traveling hydraulic motor; and a solenoid proportional valve configured to generate control pressure for controlling displacement volume of the traveling hydraulic pump based on a control signal output from the controller, and the controller is configured to: store at least one predetermined characteristic table indicating correlation between discharge pressure of the loading hydraulic pump or an operation state of the engine and maximum discharge pressure of the traveling hydraulic pump; and in a case where the vehicle speed detected by the vehicle speed sensor is vehicle speed that corresponds to work requiring traction force, based on the discharge pressure detected by the discharge pressure sensor or the operation state of the engine detected by the operation state sensor, output a control signal to the solenoid proportional valve so as to obtain the maximum discharge pressure of the traveling hydraulic pump that corresponds to the at least one predetermined characteristic table.

Advantageous Effects of Invention

According to the present invention, it is possible to easily and finely set and change a control characteristic of traction force while a configuration of a hydraulic circuit is simple. The problems, configurations, and effects other than those described above will be clarified by explanation of the embodiments below.

BRIEF DESCRIPTION OF DRAWINGS

FIG. 7 Each of FIGS. 7(a) and 7(b) illustrates a graph showing a seventh characteristic table.

DESCRIPTION OF EMBODIMENTS

Hereinafter, as an aspect of the loading vehicle according to an embodiment of the present invention, a wheel loader configured to perform loading work by excavating such as earth and sand and minerals in a strip mine and loading them into a dump truck, etc. will be described.

(Overall Configuration of Wheel Loader 1)

First, an overall configuration of a wheel loader 1 according to an embodiment of the present invention will be described with reference to FIG. 1.

Figure 1:
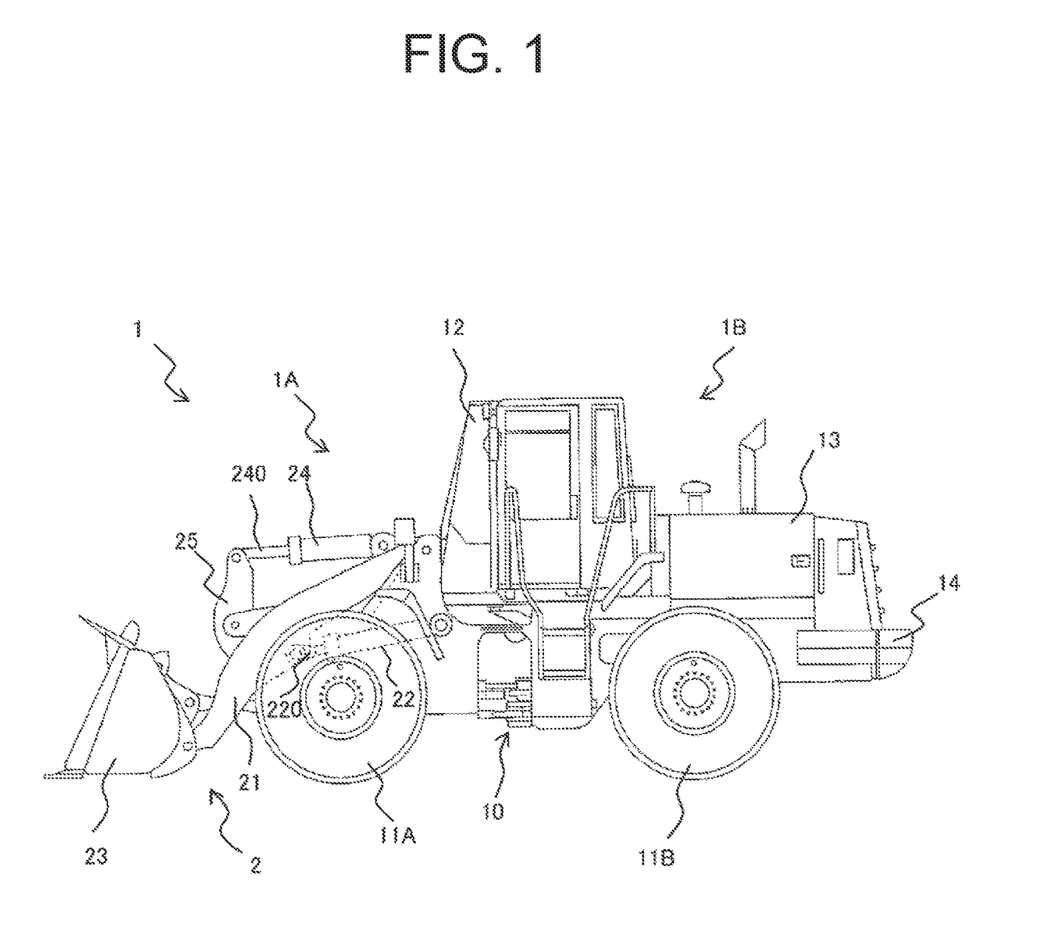
FIG. 1 is a side view illustrating appearance of a wheel loader according to an embodiment of the present invention.

FIG. 1 is a side view illustrating appearance of the wheel loader 1 according to the embodiment of the present invention.

The wheel loader 1 is an articulated type work vehicle which is swiveled on a central portion of a vehicle body including a front frame 1A and a rear frame 1B and steered thereby. In particular, the front frame 1A and the rear frame 1B are connected to each other by a center joint 10 to swivel in the left and right direction so that the front frame 1A is bent in the left and right directions with respect to the rear frame 1B.

The front frame 1A is provided with a pair of left and right front wheels 11A and a working device 2 for performing loading work. The rear frame 1B is provided with a pair of left and right rear wheels 11B, an operator's cab 12 to be boarded by an operator, a mechanical room 13 in which devices such as an engine, a controller, hydraulic pumps, etc. are accommodated, and a counterweight 14 for maintaining balance between the vehicle body and the working device 2 to prevent the vehicle body from tilting. In the rear frame 1B, the operator's cab 12 is disposed on the front, the counterweight 14 is disposed on the rear, and the mechanical room 13 is disposed between the operator's cab and the counterweight 14, respectively.

The working device 2 includes a lift arm 21 attached to the front frame 1A, a pair of lift arm cylinders 22 configured to expand and contract to rotate the lift arm 21 in the vertical direction with respect to the front frame 1A, a bucket 23 attached to the front end portion of the lift arm 21, a bucket cylinder 24 configured to expand and contract to rotate the bucket 23 in the vertical direction with respect to the lift arm 21, a bell crank 25 that is rotatably connected to the lift arm 21 and constitutes a link mechanism between the bucket 23 and the bucket cylinder 24, and a plurality of pipelines (not illustrated) for leading pressure oil to the pair of lift arm cylinders 22 and the bucket cylinder 24. FIG. 1 illustrates only one of the pair of lift arm cylinders 22, which is disposed on the left side, by indicating it with a broken line.

The lift arm 21 is rotated in the upward direction by expansion of a rod 220 of each of the lift arm cylinders 22, and rotated in the downward direction by contraction of each rod 220. The bucket 23 is tilted (rotated in the upward direction with respect to the lift arm 21) by expansion of a rod 240 of the bucket cylinder 24, and dumped (rotated in the downward direction with respect to the lift arm 21) by contraction of the rod 240.

In the wheel loader 1, the bucket 23 can be replaced with various attachments such as a blade, and in addition to excavation work using the bucket 23, various work such as dozing work and snow removing work can be performed. The excavation work, dozing work, and snow removing work require traction force (traveling drive force) greater than, for example, that in conveyance work in which the wheel loader 1 travels on a road surface while being loaded on the bucket 23. However, when the traction force is too large, there is a possibility that problems such that the wheels 11A, 11B slip or the working device 2 cannot be lifted upward occur, which may result in decrease in work efficiency. Accordingly, it is necessary to adjust balance between the traction force and drive force (digging force) of the working device 2.

(Drive System of Wheel Loader 1)

Next, a drive system of the wheel loader 1 will be described with reference to FIG. 2.

Figure 2:
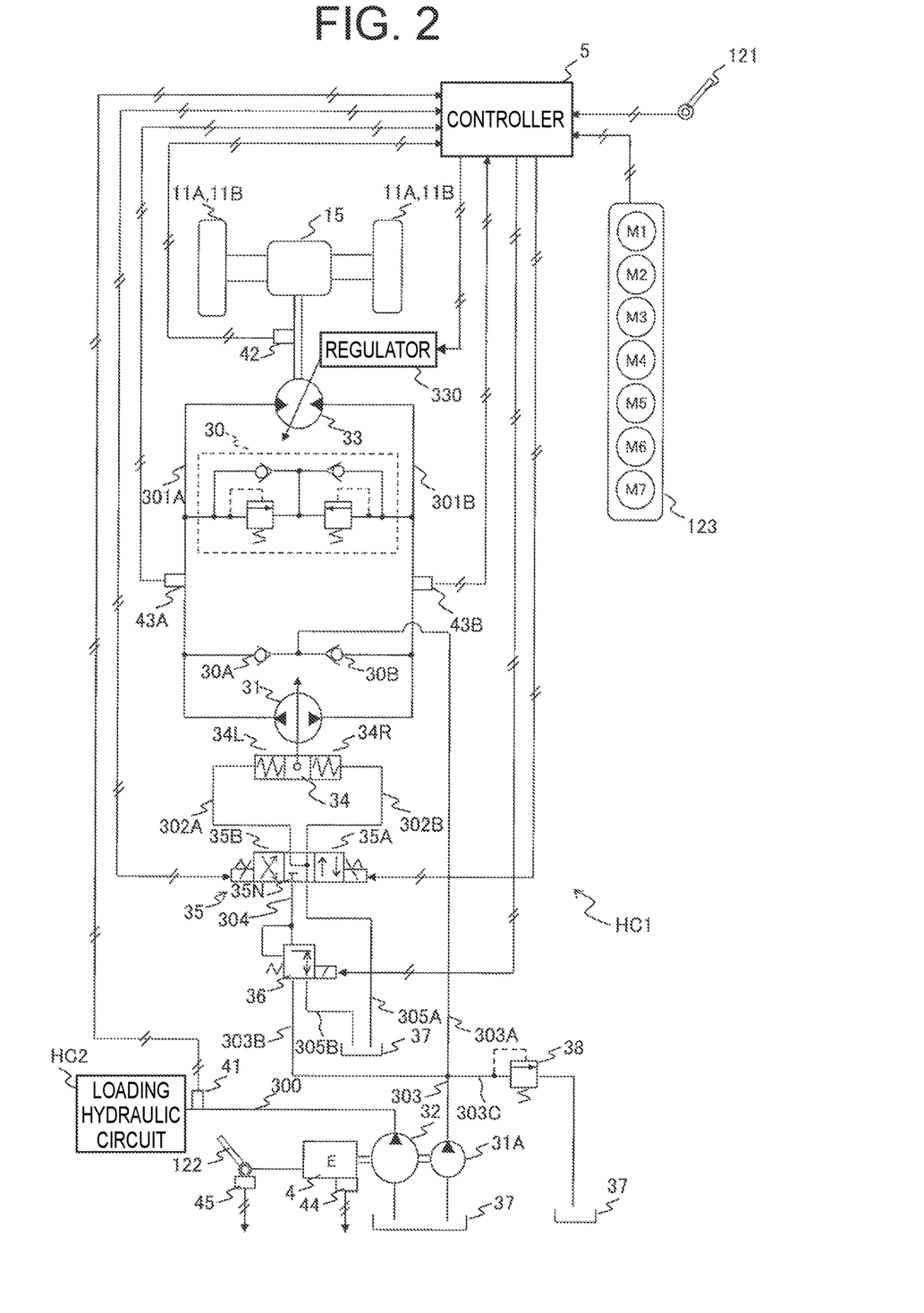
FIG. 2 illustrates a hydraulic circuit and an electric circuit according to drive of a wheel loader.

FIG. 2 illustrates a hydraulic circuit HC1 and an electric circuit according to drive of the wheel loader 1.

The wheel loader 1 includes a traveling hydraulic circuit HC1 which is a hydraulic circuit for driving the vehicle body to travel, and a loading hydraulic circuit HC2 which is a hydraulic circuit for driving the working device 2. The HST pump 31 serving as a traveling hydraulic pump, an HST charge pump 31A for providing hydraulic oil for controlling the HST pump 31, and the loading hydraulic pump 32 for supplying the working device 2 with the hydraulic oil are commonly driven by one engine 4.

A lording side discharge pipeline 300 is connected to a discharge side of the loading hydraulic pump 32, and a discharge pressure sensor 41 configured to detect discharge pressure of the loading hydraulic pump 32 is provided on the lording side discharge pipeline 300. The discharge pressure detected by the discharge pressure sensor 41 is input in the controller 5 and used to determine an operation state of the working device 2.

The wheel loader 1 employs an HST traveling drive system. The traveling hydraulic circuit HC1 includes the HST pump 31, the HST charge pump 31A, and an HST motor 33 serving as a traveling hydraulic motor.

Both the HST pump 31 and the HST motor 33 are electrically controlled hydraulic pumps which are controlled by the controller 5, and are connected through a closed circuit via a pair of connection pipelines 301A, 301B. A relief valve unit 30 is provided on a pipeline which connects one connection pipeline 301A and the other connection pipe 301B so as to limit maximum pressure in the pair of connection pipelines 301A, 301B.

The HST pump 31 is a swash plate type or a swash shaft type variable displacement hydraulic pump in which displacement volume is controlled in accordance with a tilt amount (tilt angle). The tilt amount is adjusted by a tilt cylinder 34 having left and right oil chambers 34L, 34R. The tilt cylinder 34 is driven by hydraulic oil discharged from the HST charge pump 31A which acts as pilot pressure on each of the left and right oil chambers 34L, 34R.

A traveling side discharge pipeline 303 is connected at a discharge side of the HST charge pump 31A. The traveling side discharge pipeline 303 branches into three main pipelines, i.e., a first main pipeline 303A, a second main pipeline 303B, and a third main pipeline 303C. A part of the hydraulic oil discharged from the HST charge pump 31A passes through the first main pipeline 303A, and then is led to each of the pair of connection pipes 301A, 301B via check valves 30A, 30B.

Between the HST charge pump 31A and the tilt cylinder 34, a forward/reverse switch valve 35 configured to switch forward/reverse movement of the vehicle body, and a solenoid proportional pressure reducing valve 36 as a solenoid proportional valve configured to generate control pressure for controlling displacement volume of the HST pump 31, are provided.

The forward/reverse movement switch valve 35 is connected to the left and right oil chambers 34L, 34R of the tilt cylinder 34 via a pair of pilot pipelines 302A, 302B. The forward/reverse movement switch valve 35 includes a forward position 35A which is a position for moving the vehicle body in a forward direction, a reverse position 35B which is a position for moving the vehicle body in a reverse direction, and a neutral position 35N which is a position for stopping the vehicle body. The forward/reverse movement switch valve 35 is a solenoid switch valve, which is configured to respectively switch the forward position 35A, the reverse position 35B, and the neutral position 35N based on an operation signal output from an electric forward/reverse movement switch lever 121 provided in the operator's cab 12 to the forward/reverse movement switch valve 35 via the controller 5.

The solenoid proportional pressure reducing valve 36 is disposed on the upstream side of the forward/reverse switch valve 35, and connected to the traveling side discharge pipeline 303 via the second main pipeline 303B. A charge relief valve 38 is provided in the third main pipeline 303C connected to a hydraulic oil tank 37, and thus primary pressure of the solenoid proportional pressure reducing valve 36 corresponds to HST charge relief pressure. Then, the solenoid proportional pressure reducing valve 36 decompresses the primary pressure based on a control signal output from the controller 5, and generates secondary pressure as control pressure for controlling the displacement volume of the HST pump 31.

After being led to the forward/reverse movement switch valve 35 via a pipeline 304, the secondary pressure generated by the solenoid proportional pressure reducing valve 36 acts on, as tilt control pressure, either of the left and right oil chambers 34L, 34R of the tilt cylinder 34, thereby controlling the displacement volume of the HST pump 31. Both the forward/reverse movement switch valve 35 and the solenoid proportional pressure reducing valve 36 are connected to the hydraulic oil tank 37 via the discharge pipelines 305A, 305B.

The HST motor 33 is a swash plate type or a swash shaft type variable displacement hydraulic motor in which the displacement volume is controlled in accordance with a tilt amount (tilt angle). The tilt amount is adjusted by a regulator 330 which is controlled based on a command signal output from the controller 5.

On an output shaft 302 of the HST motor 33, an HST motor rotational speed sensor 42 configured to detect rotational speed of the HST motor 33 is provided. In the present embodiment, the HST motor rotational speed sensor 42 is used to detect vehicle speed V. Therefore, the HST motor rotational speed sensor 42 is an aspect of a vehicle speed sensor for detecting the vehicle speed V. In this connection, the vehicle speed V is not necessarily detected by using the rotational speed of the HST motor 33, but for example, may be detected by using an instruction value of the tilt angle of the HST motor 33.

As illustrated in FIG. 2, when the forward/reverse movement switch valve 35 is in the neutral position 35N, the pilot pipeline 302A and the pilot pipeline 302B are connected to each other, and thus the left and right oil chambers 34L, 34R of the tilt cylinder 34 communicate with the hydraulic oil tank 37 via the discharge pipeline 305A. Accordingly, the pressure acting on the left and right oil chambers 34L, 34R of the tilt cylinder 34 becomes the same.

As a result, since a piston of the tilt cylinder 34 is in a neutral position and the displacement volume of the HST pump 31 becomes zero, the discharge flow rate becomes zero and thus the wheel loader 1 is stopped.

On the other hand, when the operator operates the forward/reverse movement switch lever 121 in the forward direction to switch the forward/reverse movement switch valve 35 to the forward position 35A, the secondary pressure of the solenoid proportional pressure reducing valve 36 is led to the pilot pipeline 302A which is one of the pair of pilot pipelines, and acts on the left oil chamber 34L of the tilt cylinder 34. At this time, the pressure does not act on the right oil chamber 34R of the tilt cylinder 34 since it communicates with the hydraulic oil tank 37 via the pilot pipeline 302B which is the other one of the pair of pilot pipelines and the discharge pipeline 305A.

Accordingly, the piston of the tilt cylinder 34 is displaced to the right direction in FIG. 2 by an amount of the secondary pressure generated by the solenoid proportional pressure reducing valve 36, whereby the displacement volume of the HST pump 31 is set. Since the HST pump 31 discharges the hydraulic oil at a flow rate corresponding to the set displacement volume to a side of the connection pipeline 301A which is one of the pair of connection pipelines, the HST motor 33 is rotated in a normal direction, thereby moving the wheel loader 1 in the forward direction.

The connection pipeline 301A is provided with a forward side pressure sensor 43A configured to detect discharge pressure of the HST pump 31 on the forward side. A pressure value detected by the forward side pressure sensor 43A is input to the controller 5.

When the operator operates the forward/reverse movement switch lever 121 in the reverse direction to switch the forward/reverse movement switch valve 35 to the reverse position 35B, the secondary pressure of the solenoid proportional pressure reducing valve 36 is led to the pilot line 302B, and acts on the right oil chamber 34R of the tilt cylinder 34. At this time, the pressure does not act on the left oil chamber 34L of the tilt cylinder 34 since it communicates with the hydraulic oil tank 37 via the pilot pipeline 302A and the discharge pipeline 305.

Accordingly, the piston of the tilt cylinder 34 is displaced to the left direction in FIG. 2 by an amount of the secondary pressure generated by the solenoid proportional pressure reducing valve 36, whereby the displacement volume of the HST pump 31 is set. Since the HST pump 31 discharges the hydraulic oil at a flow rate corresponding to the set displacement volume to a side of the connection pipeline 301B which is the other one of the pair of connection pipelines, the HST motor 33 is rotated in an opposite direction, thereby moving the wheel loader 1 in the reverse direction.

The connection pipeline 301B is provided with a reverse side pressure sensor 43B configured to detect discharge pressure of the HST pump 31 on the reverse side. A pressure value detected by the reverse side pressure sensor 43B is input to the controller 5.

As described above, the HST motor 33 is rotated by the hydraulic oil led from the HST pump 31. Then, output torque from the HST motor 33 is transmitted to the front wheels 11A and the rear wheels 11B via an axle 15, whereby the wheel loader 1 travels. Accordingly, the output torque of the HST motor 33 corresponds to traveling drive force of the wheel loader 1, in other words, traction force of the vehicle body.

The output torque of the HST motor 33 is expressed by the product of the displacement volume of the HST motor 33 and the traveling load pressure. In the present embodiment, the maximum discharge pressure (cut-off pressure) of the HST pump 31, in other words, the traveling load pressure side is controlled by the controller 5 so as to control the traction force of the vehicle body. It should be noted that the "traveling load pressure" corresponds to the discharge pressure of the HST pump 31 detected by the forward side pressure sensor 43A when the vehicle body is moving in the forward direction, while corresponding to the discharge pressure of the HST pump 31 detected by the reverse side pressure sensor 43B when the vehicle body is moving in the reverse direction.

In view of importance of the balance between the traction force of the vehicle body and the driving force of the working device 2, in particular, it is necessary to control the traction force of the vehicle body during work requiring the traction force, such as excavation work. During this kind of work, the vehicle speed of the wheel loader 1 is, for example, the low speed (about 0-3 km/h) which is slower than the vehicle speed during the conveyance work in which the wheel loader 1 travels on the road surface while being loading on the bucket 23, and thus a tilt amount of the HST pump 31 is very small which may be close to zero. Accordingly, when controlling the traction force, an amount of change in a case of controlling the tilt amount of the HST pump 31 may be much smaller than an amount of change in a case of controlling a tilt amount of the HST motor 33. Therefore, in a case of controlling the maximum discharge pressure of the HST pump 31, change response of the traction force of the vehicle body is faster than the case of controlling the tilt amount of the HST motor 33.

In this connection, the rotational speed N of the engine 4 is adjusted by a step-on amount ST of an accelerator pedal 122 provided in the operator's cab 12. A discharge flow rate of the HST charge pump 31A connected to the engine 4 is proportional to the rotational speed N of the engine 4. The rotational speed N of the engine 4 is detected by an engine rotational speed sensor 44 mounted on the engine 4, and the step-on amount ST of the accelerator pedal 122 is detected by a step-on amount sensor 45 mounted on the accelerator pedal 122, respectively, and are input to the controller 5. Each of the engine rotational speed sensor 44 and the step-on amount sensor 45 is an aspect of an operation state sensor configured to detect an operation state (engine operation state) of the engine 4.

In the present embodiment, the wheel loader 1 is provided, in the operator's cab 12, with a mode switch device 123 configured to switch seven control modes for controlling the traction force of the vehicle body, namely, first to seventh control modes M1 to M7. A switch signal from the mode switch device 123 is input to the controller 5.

The first control mode M1 is a control mode to be selected when work should be performed with priority on preventing the wheels 11A, 11B from slipping.

Each of the second control mode M2, the third control mode M3, and the fourth control mode M4 is a control mode to be selected when the drive force of the working device 2 should be secured by limiting the traction force not to become too large during work requiring the traction force such as hill climbing work, excavation work, dozing work, and snow removing work. The second control mode M2, the third control mode M3, and the fourth control mode M4 can be selectively used in accordance with a type of work and an environment of a work site.

The fifth control mode M5 is a control mode to be selected when work, in which the bucket 23 is made to thrust into an object to be excavated without allowing the wheels 11A, 11B to slip, for example, during excavation work performed on a slippery road surface, or work in which the working device 2 is operated to scoop up the loads such as earth and sand and minerals from the object to be excavated, should be efficiently performed.

The sixth control mode M6 is a control mode to be selected when work should be performed by using the maximum traction force.

The seventh control mode M7 is a control mode to be selected when control of the traction force should be performed based on an operation state of the engine 4 since, at the time of slippage of the wheels 11A, 11B, the accelerator pedal 122 stepped on by the operator is returned to decrease the rotational speed of the engine 4.

(Functional Configuration of Controller 5)

Next, the functional configuration of the controller 5 will be described with reference to FIGS. 3 to 7.

Figure 3:
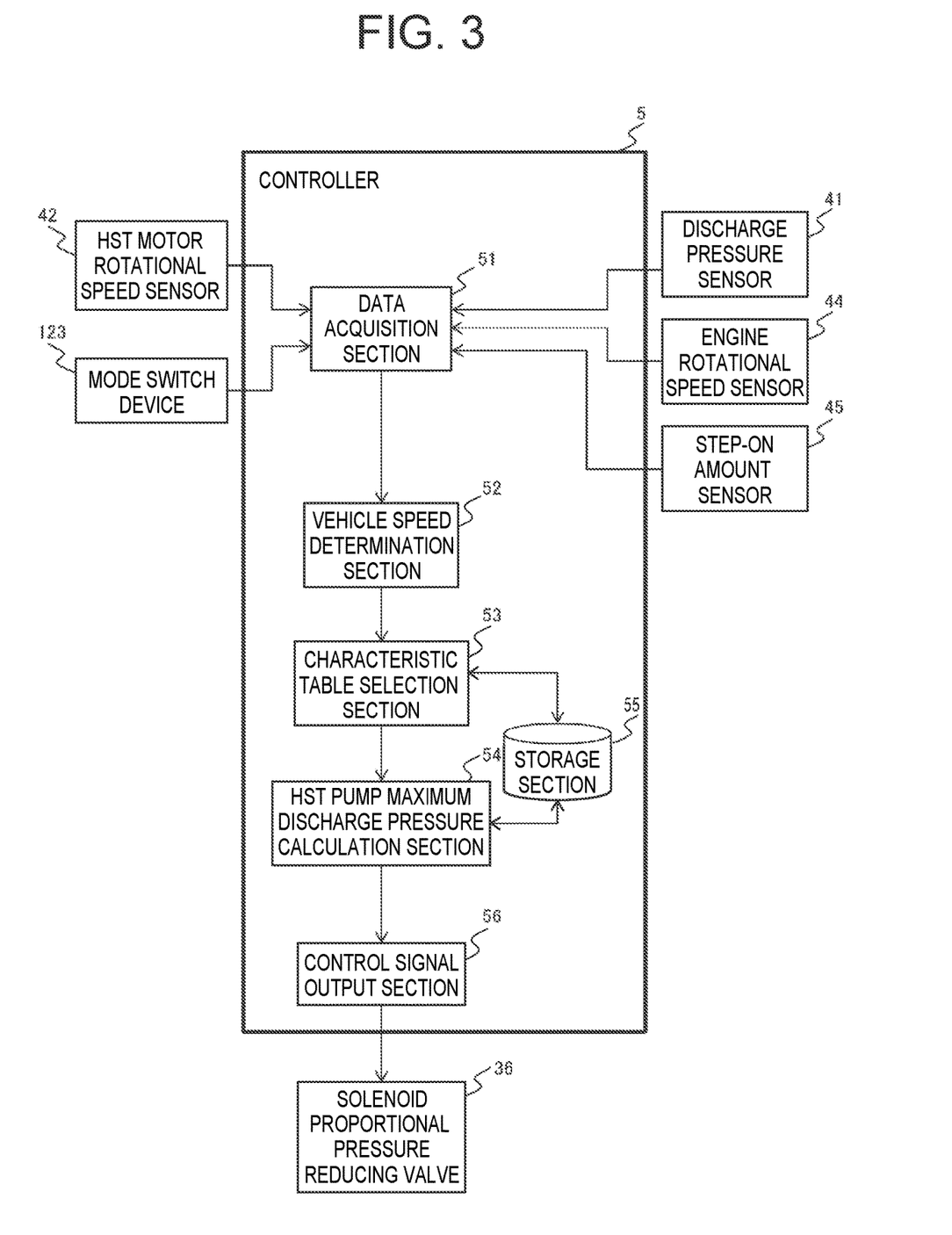
FIG. 3 is a functional block diagram illustrating functions of a controller.
Figure 4:
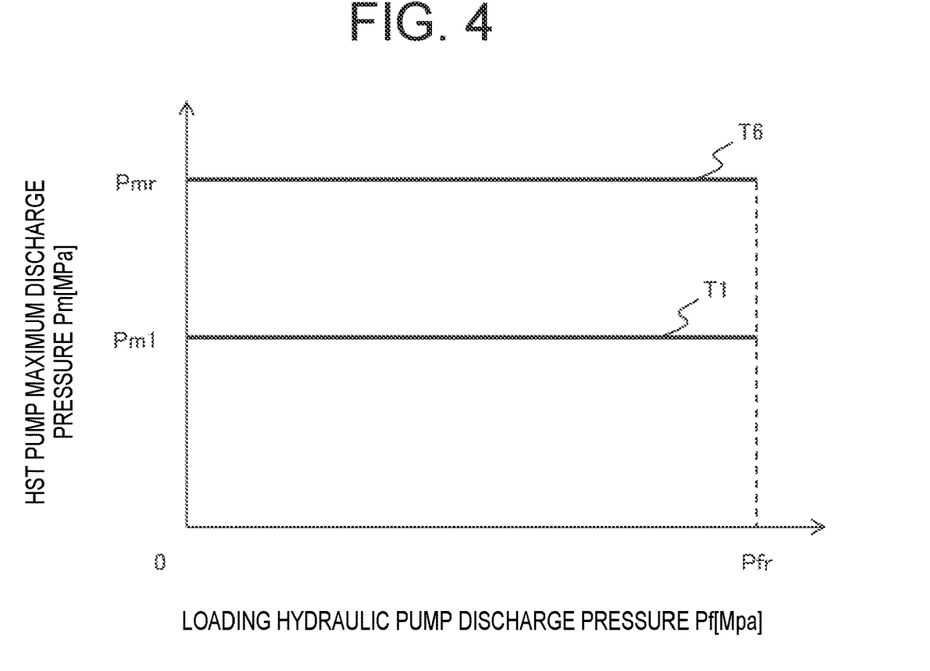
FIG. 4 illustrates a graph showing a first characteristic table and a sixth characteristic table.
Figure 5:
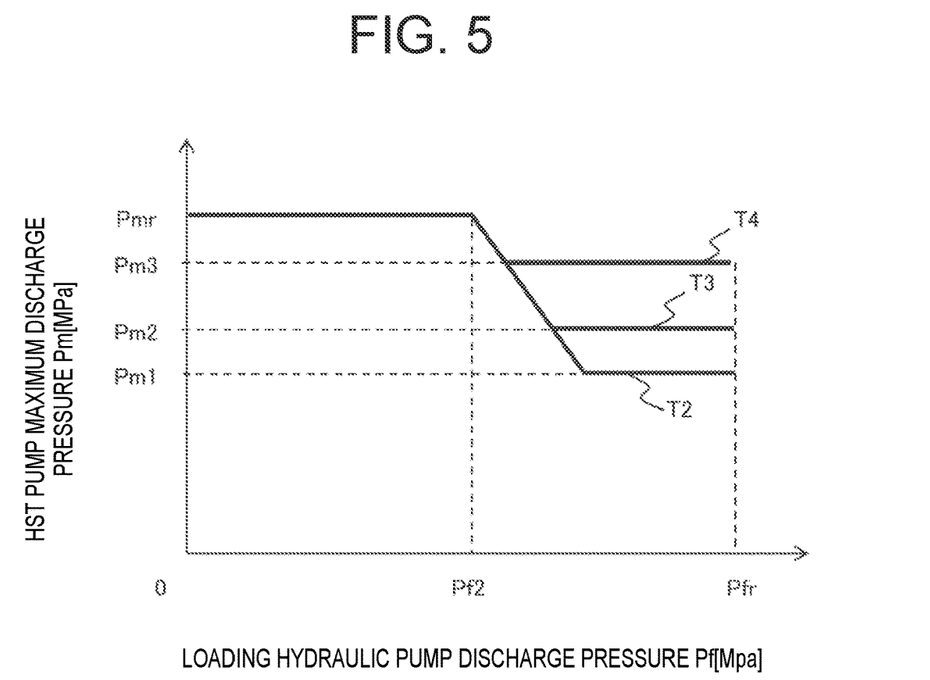
FIG. 5 illustrates a graph showing a second characteristic table, a third characteristic table, and a fourth characteristic table.
Figure 6:
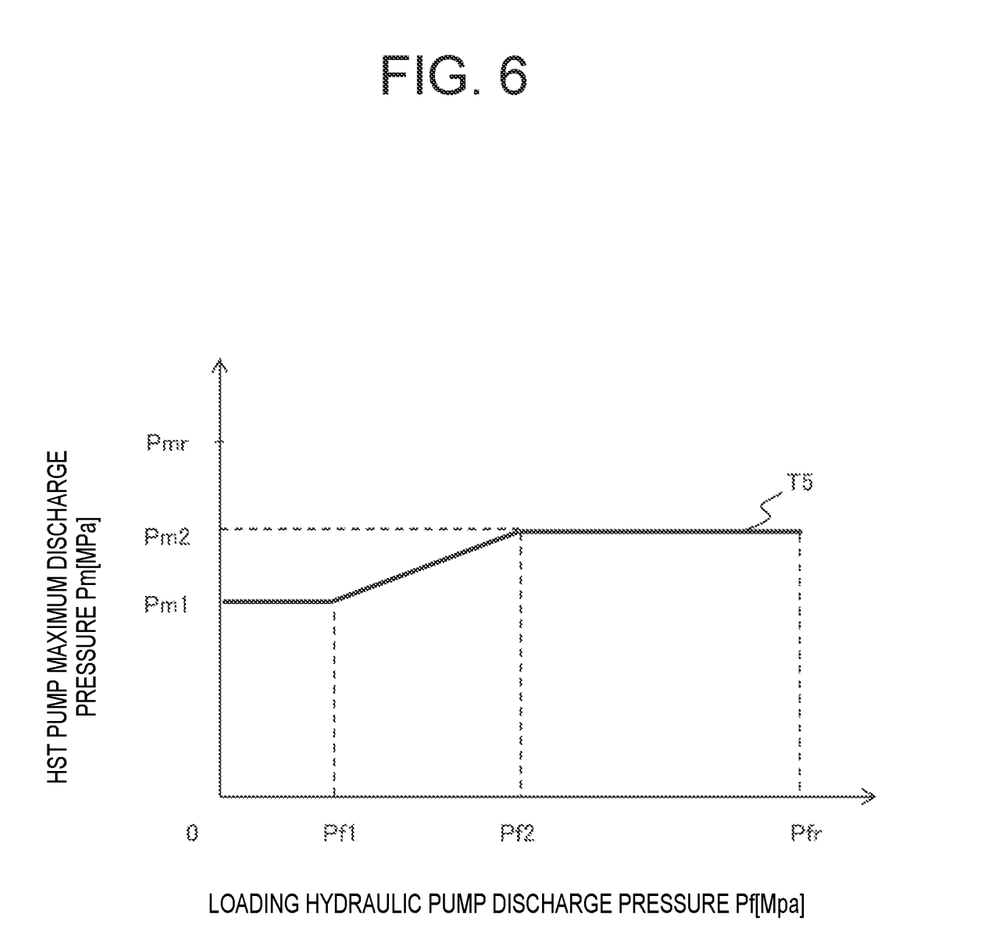
FIG. 6 illustrates a graph showing a fifth characteristic table.

FIG. 3 is a functional block diagram illustrating functions of the controller 5. FIG. 4 illustrates a graph showing a first characteristic table T1 and a sixth characteristic table T6. FIG. 5 illustrates a graph showing a second characteristic table T2, a third characteristic table T3, and a fourth characteristic table T4. FIG. 6 illustrates a graph showing a fifth characteristic table T5. Each of FIGS. 7(*a*) and 7(*b*) illustrates a graph showing a seventh characteristic table T7.

The controller 5 includes a CPU, a RAM, a ROM, an HDD, an input I/F, and an output I/F which are connected to each other via a bus. The various operation devices such as the mode switch device 123 and the various sensors such as the discharge pressure sensor 41, the HST motor rotational speed sensor 42, the engine rotational speed sensor 44, and the step-on amount sensor 45 are connected to the input I/F. The solenoid proportional pressure reducing valve 36, etc. is connected to the output I/F.

In this hardware configuration, the CPU reads out an arithmetic program (software) stored in a recording medium such as the ROM, the HDD, or an optical disk, expands it on the RAM, and executes the expanded arithmetic program. Accordingly, the arithmetic program and the hardware are operated in cooperation, thereby realizing the functions of the controller 5.

In the present embodiment, the controller 5 is described by a combination of software and hardware. Meanwhile, the present invention is not limited thereto, but an integrated circuit that realizes the functions of an arithmetic program executed on the side of the wheel loader 1 may be used.

As illustrated in FIG. 3, the controller 5 includes a data acquisition section 51, a vehicle speed determination section 52, a characteristic table selection section 53, a storage section 54, an HST pump maximum discharge pressure calculation section 55, and a control signal output section 56.

The data acquisition section 51 acquires a switch signal output from the mode switch device 123, and data relating to the vehicle speed V detected by the HST motor rotational speed sensor 42, the discharge pressure Pf of the loading hydraulic pump 32 detected by the discharge pressure sensor 41, the step-on amount ST of the accelerator pedal 122 detected by the step-on amount sensor 45, and the rotational speed N of the engine 4 detected by the engine rotational speed sensor 44, respectively.

Based on the vehicle speed V acquired by the data acquisition section 51, the vehicle speed determination section 52 determines whether the vehicle speed is low which is the vehicle speed during the work requiring the traction force. That is, in order to distinguish the current work from work requiring no traction force, for example, work in which the wheel loader 1 travels at constant speed while being loaded on the bucket 23, the vehicle speed determination section 52 determines whether the vehicle speed is equal to or lower than vehicle speed V1 which is set in advance to correspond to the work requiring the traction force. Here, the "work requiring the traction force" corresponds to the work such as the above-described excavation work, dozing work, and snow removing work.

When the vehicle speed determination section 52 determines that the vehicle speed is the low speed, based on the switch signal acquired by the data acquisition section 51, the characteristic table selection section 53 reads out and selects, from the storage section 54, a characteristic table corresponding to the control mode switched by the mode switch device 123.

The storage section 54 stores the vehicle speed V1 corresponding to the work requiring the traction force. Furthermore, the storage section 54 stores the first to seventh characteristic tables T1 to T7 indicating correlation between the discharge pressure Pf of the loading hydraulic pump 32 or an operation state of the engine 4 (step-on amount ST of the accelerator pedal 122 or rotational speed N of the engine 4) and the maximum discharge pressure Pm of the HST pump 31. In the present embodiment, the first to sixth characteristic tables T1 to T6 define the correlation between the discharge pressure Pf of the loading hydraulic pump 32 and the maximum discharge pressure Pm of the HST pump 31, and correspond to the first to sixth control modes M1 to M6 of the mode switch device 123. The seventh characteristic table T7 defines the correlation between the operation state of the engine 4 and the maximum discharge pressure Pm of the HST pump 31, and corresponds to the seventh control mode M7 of the mode switch device 123.

Specifically, as illustrated in FIG. 4, the first characteristic table T1 corresponding to the first control mode M1 is a characteristic in which the maximum discharge pressure Pm of the HST pump 31 is constant at a first limit pressure value Pm1, which is smaller than an upper limit pressure value Pmr (<Pmr), regardless of the discharge pressure Pf of the loading hydraulic pump 32. Here, the "upper limit pressure value Pmr" is a rated value (100%) of the maximum discharge pressure Pm in the HST pump 31, and the "first limit pressure value Pm1" is a first pressure value corresponding to, for example, 50% of the upper limit pressure value Pmr.

As illustrated in FIG. 5, the second characteristic table T2 corresponding to the second control mode M2 is a characteristic in which, when the discharge pressure Pf of the loading hydraulic pump 32 reaches a pressure value Pf2 (hereinafter, simply referred to as "loading operation pressure value Pf2") corresponding to start of a lifting operation of the working device 2 (lift arm 21), the maximum discharge pressure Pm of the HST pump 31 is limited from the upper limit pressure value Pmr to the first limit pressure value Pm1.

As illustrated in FIG. 5, the third characteristic table T3 corresponding to the third control mode M3 is a characteristic in which, when the discharge pressure Pf reaches the loading operation pressure value Pf2, the maximum discharge pressure Pm of the HST pump 31 is limited from the upper limit pressure value Pmr to a second limit pressure value Pm2. The "second limit pressure value Pm2" is a second pressure value corresponding to, for example, 60% of the upper limit pressure value Pmr.

As illustrated in FIG. 5, the fourth characteristic table 14 corresponding to the fourth control mode M4 is a characteristic in which, when the discharge pressure Pf reaches the loading operation pressure value Pf2, the maximum discharge pressure Pm of the HST pump 31 is limited from the upper limit pressure value Pmr to a third limit pressure value Pm3. The "third limit pressure value Pm3" is a pressure value corresponding to, for example, 75% of the upper limit pressure value Pmr.

That is, in the second characteristic table T2, the third characteristic table T3, and the fourth characteristic table T4, when the discharge pressure Pf reaches the loading operation pressure value Pf2, the maximum discharge pressure Pm of the HST pump 31 is limited from the upper limit pressure value Pmr to the limit pressure values Pm1, Pm2, Pm3 which are smaller than the upper limit pressure value Pmr (Pm1<Pmr, Pm2<Pmr, Pm3<Pmr).

In the present embodiment, when the maximum discharge pressure Pm of the HST pump 31 is limited to each of the limit pressure value Pm1, Pm2, Pm3 from the upper limit pressure value Pmr, the maximum discharge pressure Pm of the HST pump 31 is controlled proportionally to decrease as the discharge pressure Pf of the loading hydraulic pump 32 increases. In addition, the first to third limit pressure value Pm1, Pm2, Pm3 increases in the order of the first limit pressure value Pm1, the second limit pressure value Pm2, and the third limit pressure value Pm3 (Pm1<Pm2<Pm3), so that each of the second to fourth characteristic tables T2 to T4 can be selectively used in accordance with such as a type of a work object and a ground condition of a work site.

As illustrated in FIG. 6, the fifth characteristic table T5 corresponding to the fifth control mode M5 is a characteristic in which, when the discharge pressure Pf of the loading hydraulic pump 32 is a pressure value Pf1 corresponding to a state in which the lifting operation of the working device 2 is not performed, the maximum discharge pressure Pm of the HST pump 31 is limited to the first limit pressure value Pm1, while, when the discharge pressure Pf of the loading hydraulic pump 32 reaches the loading operation pressure value Pf2, the maximum discharge pressure Pm of the HST pump 31 increases from the first limit pressure value Pm1 and becomes constant at the second limit pressure value Pm2.

The fifth characteristic table T5 is a characteristic suitable for, in particular, work which is performed on a slippery road surface. On the slippery road surface, the wheels 11A, 11B slip if setting the maximum discharge pressure Pm of the HST pump 31 to be the upper limit pressure value Pmr which is a rated value even when the discharge pressure Pf of the loading hydraulic pump 32 becomes the relief pressure Pfr. Accordingly, even when the discharge pressure Pf of the loading hydraulic pump 32 becomes the relief pressure Pfr, it is desirable to set the maximum discharge pressure Pm of the HST pump 31 to be constant at the second limit pressure value Pm2 which is greater than the first limit pressure value Pm1 and smaller than the upper limit pressure value Pmr (Pm1<Pm2<Pmr).

As illustrated in FIG. 4, the sixth characteristic table T6 corresponding to the sixth control mode M6 is a characteristic in which the maximum discharge pressure Pm of the HST pump 31 becomes constant at the upper limit pressure value Pmr regardless of the discharge pressure Pf of the loading hydraulic pump 32.

Figure 7A:
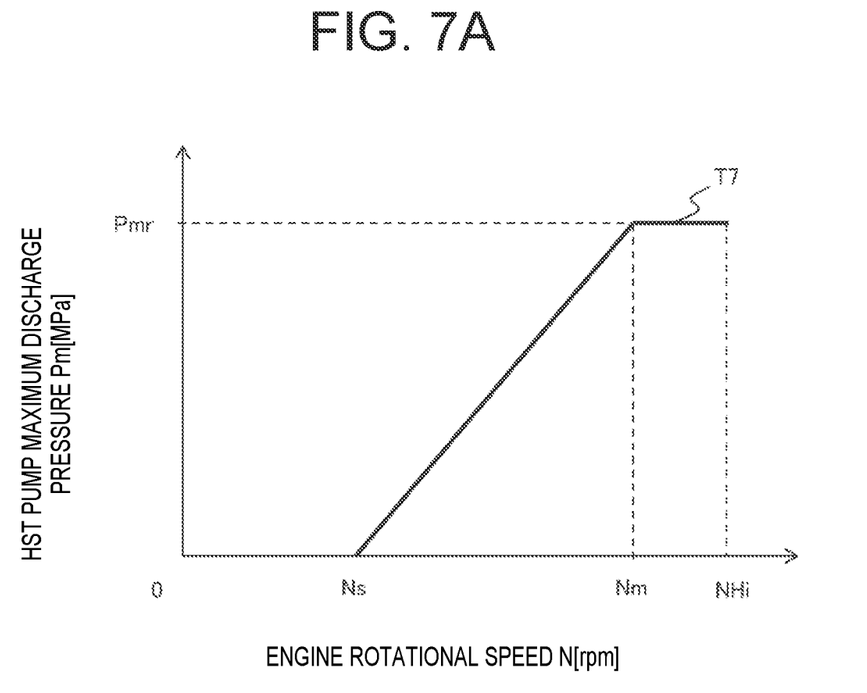
Figure 7B:
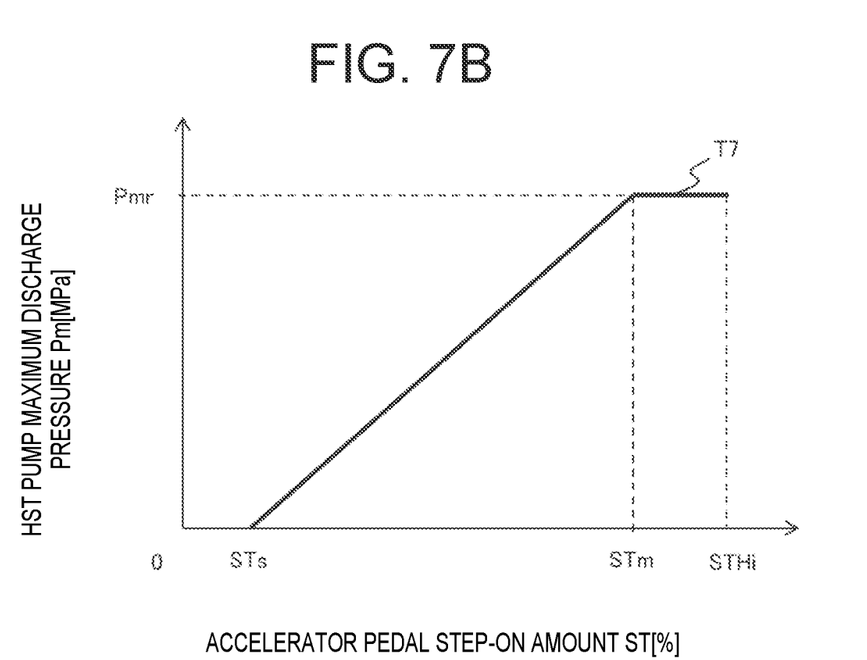

As illustrated in FIGS. 7(a) and 7(b), the seventh characteristic table T7 corresponding to the seventh control mode M7 is a characteristic in which the maximum discharge pressure Pm of the HST pump 31 increases to the upper limit pressure value Pmr as the rotational speed N of the engine 4 or the step-on amount ST of the accelerator pedal 122 increases. Here, each of the "rotational speed Ns" and the "stepping amount STs" when the maximum discharge pressure Pm of the HST pump 31 starts increasing is a value corresponding to a time when the wheel loader 1 starts traveling.

As described above, for example, when the wheels 11A, 11B slip during the excavation work, the operator returns the accelerator pedal 122 which has been stepped on. That is, the operator tries to reduce the traction force so as to suppress the slippage of the wheels 11A, 11B by reducing the rotational speed of the engine 4. Since the seventh characteristic table T7 defines the correlation between an operation state of the engine 4 and the maximum discharge pressure Pm of the HST pump 31, it is possible to control the maximum discharge pressure Pm of the HST pump 31 without using the discharge pressure Pf of the loading hydraulic pump 32.

The HST pump maximum discharge pressure calculation section 55 calculates, based on the discharge pressure Pf of the loading hydraulic pump 32 acquired by the data acquisition section 51, the step-on amount of the accelerator pedal 122, or the rotational speed N of the engine 4, the maximum discharge pressure Pm of the HST pump 31 corresponding to the characteristic table selected by the characteristic table selection section 53.

The control signal output section 56 outputs a control signal based on the maximum discharge pressure Pm of the HST pump 31 calculated by the HST pump maximum discharge pressure calculation section 55 to the solenoid proportional pressure reducing valve 36.

(Processing by Controller 5)

Next, a specific flow of the processing executed by the controller 5 will be described with reference to FIG. 8.

Figure 8:
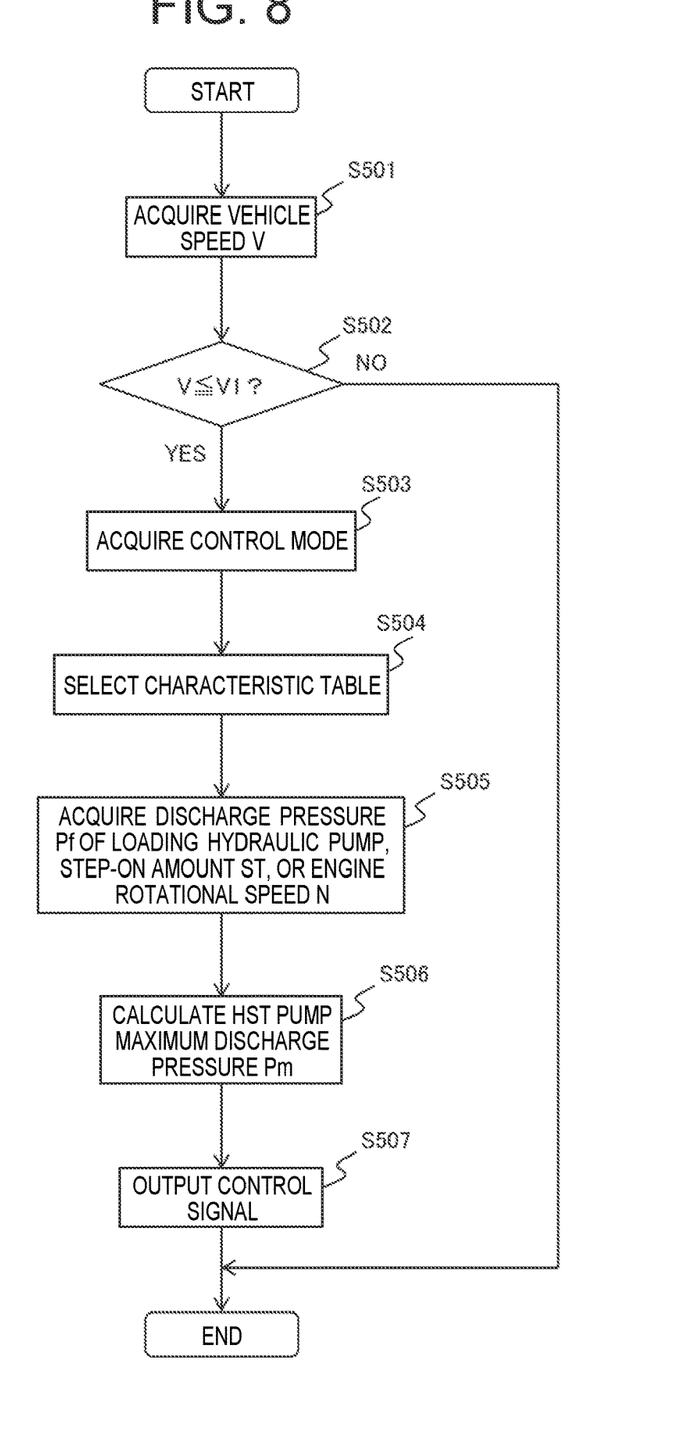
FIG. 8 illustrates a flowchart showing a flow of processing executed by a controller.

FIG. 8 illustrates a flowchart showing a flow of the processing executed by the controller 5.

First, the data acquisition section 51 acquires the vehicle speed V detected by the HST motor rotational speed sensor 42 (step S501). Next, the vehicle speed determination section 52 determines whether the vehicle speed V acquired in step S501 is equal to or less than the vehicle speed V1 corresponding to the work requiring the traction force (step S502).

When the vehicle speed determination section 52 determines that the vehicle speed V is equal to or less than V1 (V V1) in step S502 (step S502/YES), the data acquisition section 51 acquires, based on a switch signal output from the mode switch device 123, a control mode switched by the mode switch device 123 (step S503). When it is not determined in step S502 that the vehicle speed V is equal to or lower than V1, in other words, when the vehicle speed V is greater than V1 (V>V1) (step S502/NO), the processing by the controller 5 is ended.

Next, the characteristic table selection section 53 reads out, based on the control mode acquired in step S503, a characteristic table corresponding to the control mode from the storage section 54 and selects it (step S504).

Subsequently, the data acquisition section 51 acquires data required for the characteristic table selected in step S504 (discharge pressure Pf of the loading hydraulic pump 32, step-on amount ST of the accelerator pedal 122, or rotational speed N of the engine 4) (step S505).

Next, the HST pump maximum discharge pressure calculation section 55 calculates, based on the data acquired in step S505, the maximum discharge pressure Pm of the HST pump 31 corresponding to the characteristic table selected in step S504 (step S506). Then, the control signal output section 56 outputs a control signal based on the maximum discharge pressure Pm of the HST pump 31 calculated in step S506 to the solenoid proportional pressure reducing valve 36 (step S507), and thereafter, the processing by the controller 5 is ended.

As described above, in the electronically controlled HST pump 31, the maximum discharge pressure Pm is controlled via the solenoid proportional pressure reducing valve 36 by a control signal output from the controller 5. Accordingly, it is possible to simply configure the traveling hydraulic circuit HC1 as compared with a case where the maximum discharge pressure Pm is controlled by using a hydraulic pilot type cut-off valve.

In addition, in the present invention, the controller 5 stores the first to seventh characteristic tables T1 to T7 while an operator is allowed to select a characteristic table corresponding to a control mode which has been switched by the mode switch device 123, thereby realizing the maximum discharge pressure Pm of the HST pump 31 corresponding to the selected characteristic table. Accordingly, it is possible to easily and finely set and change a control characteristic of the traction force in accordance with contents of work, an environment of a work site, preference of the operator, etc.

In the above, the embodiment of the present invention has been described. It should be noted that the present invention is not limited to the embodiment and modifications described above, and various other modifications are included. For example, the embodiments described above have been explained in detail in order to clarify the present invention, but are not necessarily limited to those having all the configurations described. In addition, a part of the configuration of the present embodiment can be replaced with that of another embodiment, and the configuration of another embodiment can be added to the configuration of the present embodiment. Furthermore, it is possible to add, delete, or replace another configuration with respect to a part of the configuration of the present embodiment.

For example, in the embodiment above, the solenoid proportional pressure reducing valve 36 is used as a solenoid proportional valve configured to generate the control pressure for controlling the displacement volume of the HST pump 31. Meanwhile, a pressure reducing valve is not necessarily used therefor.

For example, in the embodiment described above, the wheel loader 1 is provided with the seven control modes for controlling the traction force of the vehicle body, i.e., the first to seventh control modes M1 to M7. Meanwhile, there is no particular limitation on the number of control modes, for example, only one control mode corresponding to a predetermined characteristic table may be provided. In such a case, the wheel loader 1 does not necessarily include the mode switch device 123, but it is sufficient to configure the wheel loader 1 to execute control processing in accordance with the control mode when it is determined that the vehicle speed is equal to or less than V1 (V≤V1).

REFERENCE SIGNS LIST

1: wheel loader (loading vehicle)
2: working device
4: engine
5: controller
11A: front wheel (wheel)
11B: rear wheel (wheel)
31: HST pump (traveling hydraulic pump)
32: loading hydraulic pump
33: HST motor (traveling hydraulic motor)
36: solenoid proportional pressure reducing valve (solenoid proportional valve)
41: discharge pressure sensor
42: HST motor rotational speed sensor (vehicle speed sensor)
44: engine rotational speed sensor (operation state sensor)
45: step-on amount sensor (operation state sensor)
123: mode switch device
T1 to T7: first to seventh characteristic tables

The invention claimed is:

1. A loading vehicle comprising:
a vehicle body including a plurality of wheels;
an engine mounted on the vehicle body;
a variable displacement traveling hydraulic pump that is driven by the engine;
a traveling hydraulic motor that is connected to the traveling hydraulic pump through a closed circuit and transmits a drive force of the engine to the plurality of wheels;
a working device that is mounted rotatably in a vertical direction with respect to the vehicle body;
a loading hydraulic pump that is driven by the engine and supplies hydraulic oil to the working device;
a discharge pressure sensor that detects a discharge pressure of the loading hydraulic pump;
an operation state sensor that detects an operation state of the engine; and
a vehicle speed sensor configured to detect a vehicle speed,
wherein
both the traveling hydraulic pump and the traveling hydraulic motor are electronically controlled,
the loading vehicle further comprises:
a controller configured to control the traveling hydraulic pump and the traveling hydraulic motor; and
a solenoid proportional valve configured to generate control pressure for controlling a displacement volume of the traveling hydraulic pump based on a control signal output from the controller,
the controller is configured to:
store at least one predetermined characteristic table indicating a correlation between the discharge pressure of the loading hydraulic pump or an operation state of the engine and a maximum discharge pressure of the traveling hydraulic pump; and
in a case where the vehicle speed detected by the vehicle speed sensor is a vehicle speed that corresponds to work requiring traction force, based on the discharge pressure detected by the discharge pressure sensor or the operation state of the engine detected by the operation state sensor, output a control signal to the solenoid proportional valve so as to obtain the maximum discharge pressure of the traveling hydraulic pump that corresponds to the at least one predetermined characteristic table, and
the at least one predetermined characteristic table includes a characteristic in which the maximum discharge pressure of the traveling hydraulic pump becomes constant at a predetermined pressure value regardless of the discharge pressure of the loading hydraulic pump.

2. The loading vehicle according to claim 1, wherein
the operation state sensor is a rotational speed sensor configured to detect rotational speed of the engine or a step-on amount sensor configured to detect a step-on amount of an accelerator pedal, and
the at least one predetermined characteristic table includes a characteristic in which the maximum discharge pressure of the traveling hydraulic pump increases to the upper limit pressure value as the rotational speed of the engine or the step-on amount of the accelerator pedal increases.

3. The loading vehicle according to claim 1, further comprising a mode switch device configured to switch between a plurality of control modes for traction force,
wherein
the at least one predetermined characteristic table comprises a plurality of predetermined characteristic tables, and
the controller is further configured to:
store the plurality of predetermined characteristic tables; and
based on a switch signal output from the mode switch device, read out one of the plurality of predetermined characteristic tables corresponding to one of the plurality of control modes which has been switched to by the mode switch device.

4. A loading vehicle comprising:
a vehicle body including a plurality of wheels;
an engine mounted on the vehicle body;
a variable displacement traveling hydraulic pump that is driven by the engine;
a traveling hydraulic motor that is connected to the traveling hydraulic pump through a closed circuit and transmits a drive force of the engine to the plurality of wheels;
a working device that is mounted rotatably in a vertical direction with respect to the vehicle body;
a loading hydraulic pump that is driven by the engine and supplies hydraulic oil to the working device;
a discharge pressure sensor that detects a discharge pressure of the loading hydraulic pump;
an operation state sensor that detects an operation state of the engine; and
a vehicle speed sensor configured to detect a vehicle speed,
wherein
both the traveling hydraulic pump and the traveling hydraulic motor are electronically controlled,
the loading vehicle further comprises:
a controller configured to control the traveling hydraulic pump and the traveling hydraulic motor; and
a solenoid proportional valve configured to generate control pressure for controlling a displacement volume of the traveling hydraulic pump based on a control signal output from the controller,
the controller is configured to:

store at least one predetermined characteristic table indicating a correlation between the discharge pressure of the loading hydraulic pump or an operation state of the engine and a maximum discharge pressure of the traveling hydraulic pump; and in a case where the vehicle speed detected by the vehicle speed sensor is a vehicle speed that corresponds to work requiring traction force, based on the discharge pressure detected by the discharge pressure sensor or the operation state of the engine detected by the operation state sensor, output a control signal to the solenoid proportional valve so as to obtain the maximum discharge pressure of the traveling hydraulic pump that corresponds to the at least one predetermined characteristic table, the at least one predetermined characteristic table includes a characteristic in which, in a case where the discharge pressure of the loading hydraulic pump is a pressure value corresponding to a state where a lifting operation of the working device is not performed, the maximum discharge pressure of the traveling hydraulic pump is limited to a predetermined first pressure value which is smaller than an upper limit pressure value, and in a case where the discharge pressure of the loading hydraulic pump reaches a pressure value corresponding to a state where a lifting operation of the working device is started, the maximum discharge pressure of the traveling hydraulic pump increases from the predetermined first pressure value and becomes constant at a predetermined second pressure value which is greater than the predetermined first pressure value and smaller than the upper limit pressure value.

5. A loading vehicle comprising:

a vehicle body including a plurality of wheels;

an engine mounted on the vehicle body;

a variable displacement traveling hydraulic pump that is driven by the engine;

a traveling hydraulic motor that is connected to the traveling hydraulic pump through a closed circuit and transmits a drive force of the engine to the plurality of wheels;

a working device that is mounted rotatably in a vertical direction with respect to the vehicle body;

a loading hydraulic pump that is driven by the engine and supplies hydraulic oil to the working device;

a discharge pressure sensor that detects a discharge pressure of the loading hydraulic pump;

an operation state sensor that detects an operation state of the engine; and a vehicle speed sensor configured to detect a vehicle speed, wherein both the traveling hydraulic pump and the traveling hydraulic motor are electronically controlled, the loading vehicle further comprises:

a controller configured to control the traveling hydraulic pump and the traveling hydraulic motor; and a solenoid proportional valve configured to generate control pressure for controlling a displacement volume of the traveling hydraulic pump based on a control signal output from the controller, the controller is configured to:

store at least one predetermined characteristic table indicating a correlation between the discharge pressure of the loading hydraulic pump or an operation state of the engine and a maximum discharge pressure of the traveling hydraulic pump; and in a case where the vehicle speed detected by the vehicle speed sensor is a vehicle speed that corresponds to work requiring traction force, based on the discharge pressure detected by the discharge pressure sensor or the operation state of the engine detected by the operation state sensor, output a control signal to the solenoid proportional valve so as to obtain the maximum discharge pressure of the traveling hydraulic pump that corresponds to the at least one predetermined characteristic table, and the at least one predetermined characteristic table includes a characteristic in which, in a case where the discharge pressure of the loading hydraulic pump reaches a pressure value corresponding to a state where a lifting operation of the working device is started, the maximum discharge pressure of the traveling hydraulic pump is limited from the upper limit pressure value to a pressure value which is smaller than the upper limit pressure value.

* * * * *